United States Patent
Ng et al.

(10) Patent No.: US 10,996,310 B2
(45) Date of Patent: May 4, 2021

(54) ESTIMATED USER LOCATION FROM CELLULAR TELEPHONY DATA

(71) Applicant: Dataspark Pte Ltd, Singapore (SG)

(72) Inventors: Yibin Ng, Singapore (SG); Yunye Jin, Singapore (SG); Jingxuan Wang, Singapore (SG); The Anh Dang, Singapore (SG); Ying Li, Singapore (SG)

(73) Assignee: DataSpark, Pte., Ltd., Singapore (SG)

( * ) Notice: Subject to any disclaimer, the term of this patent is extended or adjusted under 35 U.S.C. 154(b) by 0 days.

(21) Appl. No.: 16/470,229

(22) PCT Filed: Dec. 23, 2016

(86) PCT No.: PCT/IB2016/057961
§ 371 (c)(1),
(2) Date: Jun. 16, 2019

(87) PCT Pub. No.: WO2018/115943
PCT Pub. Date: Jun. 28, 2018

(65) Prior Publication Data
US 2019/0310342 A1  Oct. 10, 2019

(30) Foreign Application Priority Data
Dec. 23, 2016  (WO) .................. PCT/IB2016/057961

(51) Int. Cl.
*H04W 4/02* (2018.01)
*G01S 5/02* (2010.01)
*G01S 5/00* (2006.01)

(52) U.S. Cl.
CPC .......... *G01S 5/0278* (2013.01); *G01S 5/0027* (2013.01); *H04W 4/02* (2013.01); *G01S 5/02* (2013.01)

(58) Field of Classification Search
CPC .................................. H04W 4/02; H04Q 7/20
See application file for complete search history.

(56) References Cited

U.S. PATENT DOCUMENTS

| | | | |
|---|---|---|---|
| 9,706,515 B1* | 7/2017 | Chadwick | H04W 64/00 |
| 2006/0240841 A1* | 10/2006 | Bhattacharya | G01S 19/06 |
| | | | 455/456.1 |
| 2009/0177764 A1* | 7/2009 | Blatherwick | H04W 4/023 |
| | | | 709/221 |
| 2014/0057650 A1* | 2/2014 | Versteeg | G01S 5/0252 |
| | | | 455/456.1 |
| 2015/0172856 A1* | 6/2015 | Vanderwater | H04W 4/023 |
| | | | 455/457 |
| 2018/0060180 A1* | 3/2018 | Tan | G06F 11/1451 |

* cited by examiner

*Primary Examiner* — Myron Wyche
(74) *Attorney, Agent, or Firm* — Krajec Patent Offices, LLC; Russell Krajec (57) ABSTRACT

A user's location may be estimated by applying a probability function to raw user location data taken from various telephony or wireless systems. The probability function may estimate a user's location based on a training dataset that may be generated a priori to the analysis. A training dataset may be generated or updated by analyzing queries made with global positioning system (GPS) data to extract a device's GPS location. The probability function may be generated in part from physical maps. The estimated location may improve location accuracy, especially when attempting to map a user's location with accuracies that may be much smaller than a cell of a cellular telephony system.

20 Claims, 7 Drawing Sheets

500 METHOD OF GENERATING PROBABILITY MAP

ESTIMATED USER LOCATION FROM CELLULAR TELEPHONY DATA

CROSS REFERENCE TO RELATED APPLICATIONS

This patent application claims priority to and benefit of PCT application number PCT/IB2016/057961 entitled "Estimated User Location from Cellular Telephony Data" by Dataspark Pte. Ltd., filed 23 Dec. 2016, the entire contents of which are hereby expressly included by reference for all they teach and disclose.

BACKGROUND

Telecommunications systems, most notably cellular telephony systems, may have connection data from which user's locations may be determined. The naïve method for determining a user's location may be to determine which cell the user is operating, and assign the user's location to be within the cell. Some telephony data sets may include triangulated location data, which may be derived from analyzing signals from two, three, or more cell towers to determine a location.

Such approaches operate well when an area of interest is approximately the size of a cell or larger than a cell. However, when an area of interest may be smaller than a cell or when an area of interest may include only portions of several cell boundaries, the accuracy of such an approach becomes very poor. Even with triangulated location data, the accuracies of the location data may be widely variable.

SUMMARY

A user's location may be estimated by applying a probability function to raw user location data taken from various telephony or wireless systems. The probability function may estimate a user's location based on a training dataset that may be generated a priori to the analysis. A training dataset may be generated or updated by analyzing queries made with global positioning system (GPS) data to extract a device's GPS location. The probability function may be generated in part from physical maps. The estimated location may improve location accuracy, especially when attempting to map a user's location with accuracies that may be much smaller than a cell of a cellular telephony system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Estimating User Location with High Accuracy

A user's location may be estimated with much higher accuracy than conventional location determination systems. Today's cellular systems may passively detect a user's location by measuring signals received at one or more cellular towers. Some systems, such as those that support General Performance Event Handling protocols, may determine a user's location using triangulation between several cellular towers.

The location accuracy of such measurements may be enhanced by mapping the measured location data to a probability function that may be generated from more accurately measured location data. The probability function may assign a user's location probability more accurately than location data from a cellular telephony system.

The probability function may be generated by analyzing Global Positioning System (GPS) measurements that may be produced by user devices. GPS location data may be accessed by analyzing communications that may occur between the user devices and various external services. Packet sniffing and other techniques may extract GPS location data from communications that may originate at the user device and may be stored in a location database. The location database may include the user's actual location as determined by a GPS receiver on their device, as well as the measured location as determined by the cellular telephony system. The two sets of location values may be correlated into a probability function.

During normal operation, a system may receive a location observed by a cellular telephony system, then may calculate a probable location by assign a probability that the user may actually be within an area of interest. The area of interest may include a subset of a cell.

The probability function may include various time-dependent factors. For example, some systems may have a probability function that may change with time of day, day of week, day of year, or other seasonality.

The location analysis may be applied using multiple sources of location data. For example, location data may be obtained from 2G, 3G, and 4G cellular networks, from multiple cellular telephone carriers, or from non-telephony wireless systems. Analyses may be performed on data obtained from each source of data, then projected onto a common map to determine an estimate of the number of people at a given location.

Further, sampling techniques, such as the mark and recapture method, may be used to further enhance the accuracy of the population estimations. Mark and recapture methods may sample a population at two different, but relatively close times and may estimate the population with a given confidence interval.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1A:
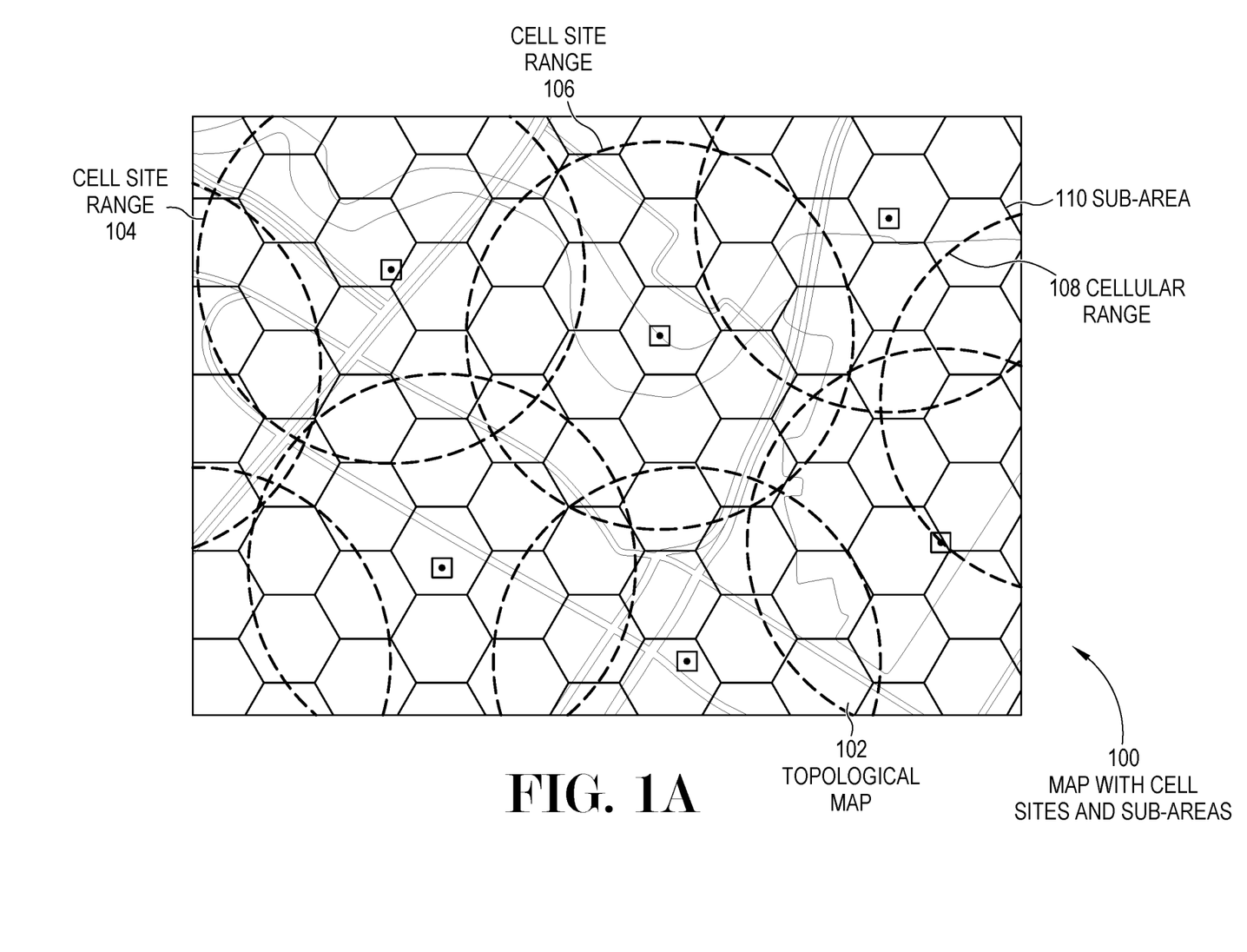
FIG. 1A is a diagram illustration of an example embodiment showing a topological map with cell sites and sub-areas.

FIG. 1A is an illustration showing an example embodiment 100 of a map with cell sites and sub-areas. A topological map 102 may have cellular telephony site ranges 104, 106, and 108 illustrated, amongst others. Overlaid on the site ranges are a series of sub-areas 110. The illustration of embodiment 100 is merely for exemplary discussion purposes and many of the items may not be to scale.

The cell site ranges may represent the coverage of a cellular site. In many cellular telephony systems, a user's approximate location may be given as the cell tower latitude and longitude. Such a location may be any location within the site ranges that may be shown. Such location inaccuracies may not be useful when attempting to determine the number of users who may be passing through a shopping mall, in a train station, at a public event, or inside a given office building. In many applications, more fined-grained location estimation may be desired.

A probability map of a sub-area within the generalized area of the cellular site may be used to estimate a user's actual location. Such a map may show a user's location with a much more meaningful location estimation than merely being within the larger area of the cellular site.

An observation of a user may be received from a cellular telephony record, such as a Short Message Service (SMS) text, call log, or data access. The observation may have a location, which may be a cell site location. In some cases, the location may be a triangulated location that may be derived from two, three, or more cell sites. The location information may have a high degree of variance or coarse granularity, which may be larger variance than may be of interest for various applications. To find a more precise location for the user, a probability map may be applied to estimate the user's location with more precision.

A probability map may be generated from precise location observations. The precise location observations may be any location information that may be more precise than a sub-area of interest. One way of gathering such information may be to receive Global Positioning System (GPS) or other location information, which may be generated by the user's mobile device. This information may be shared through an application on the device, or may be observed from other applications that may use GPS data on the user's device.

Figure 1B:
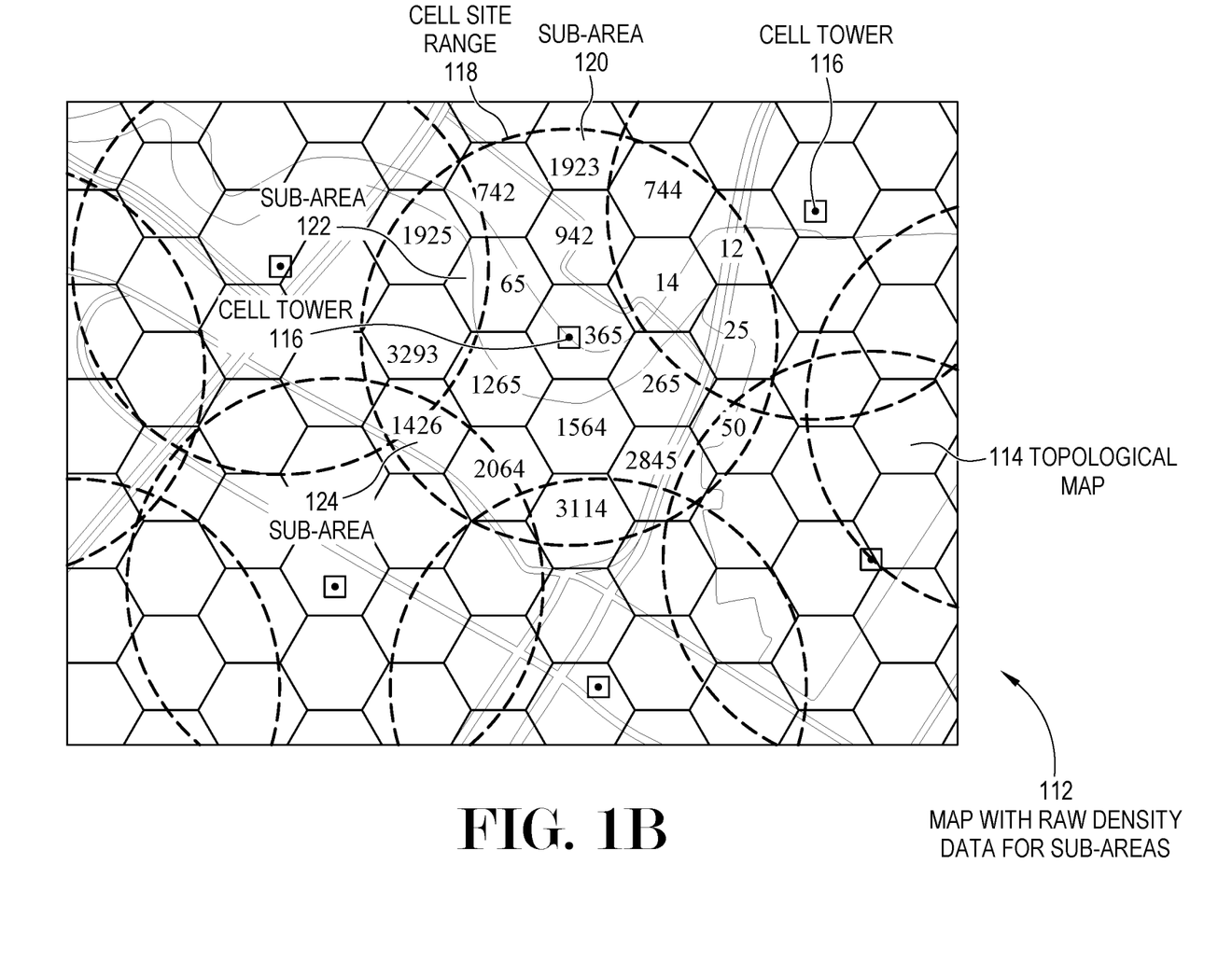
FIG. 1B is a diagram illustration of an example embodiment showing a topological map with sub-area raw observation data.

FIG. 1B is an illustration of an example embodiment 112 of a map on which several of the sub-areas may have raw precise location observations. Various sub-areas are illustrated with numbers that may represent the observed number of users in each sub-area for a given time period.

The topological map 114 may be illustrated with a cell tower 116 as a point, and a cell site range 118. Various sub-areas may be illustrated as hexagons, and several of the hexagons may have numbers in them. The numbers may represent raw observations of users in each sub-area. Such numbers are hypothetical numbers used purely for example purposes.

In the example, sub-areas are shown as uniformly-sized hexagons. Hexagons are merely one way to divide the topological map 114 into smaller areas for analysis. Some systems may have other shapes for sub-areas, and some systems may have non-uniform shapes or non-uniform sizes of sub-areas. For example, some systems may use small sub-areas, such as hexagons, for regions of particular interest or high variation, and may have larger sub-areas for regions of high uniformity or of relatively low interest.

In some systems, the physical topology of various sub-areas may be used to identify areas where people may or may not be expected to be present. For example, sub-area 122 may be largely composed of water. Even though people may congregate along the waterfront, a high percentage of the sub-area 122 may be water. Therefore, sub-area 122 may be expected to contain much lower number of people than a sub-area that encompassed all land, such as sub-area 124 for example.

Some of the sub-areas, such as sub-area 124, may be located partially inside and outside the cell site range 118. When computing the probability function for a user location in sub-area 124 or other sub-area that may span the cell site range 118, one method may be to allocate the raw number observations based on the percentage of area inside the cell site range 118.

One method for computing a probability of a user's location may be to sum all of the raw observations within the variance of a user's coarse-grained location, and divide the observations in each sub-area by the sum. Such an operation may give a percentage likelihood that a user may actually be located in a specific sub-area when the user's location observation may be received as the cell tower 116.

Figure 2:
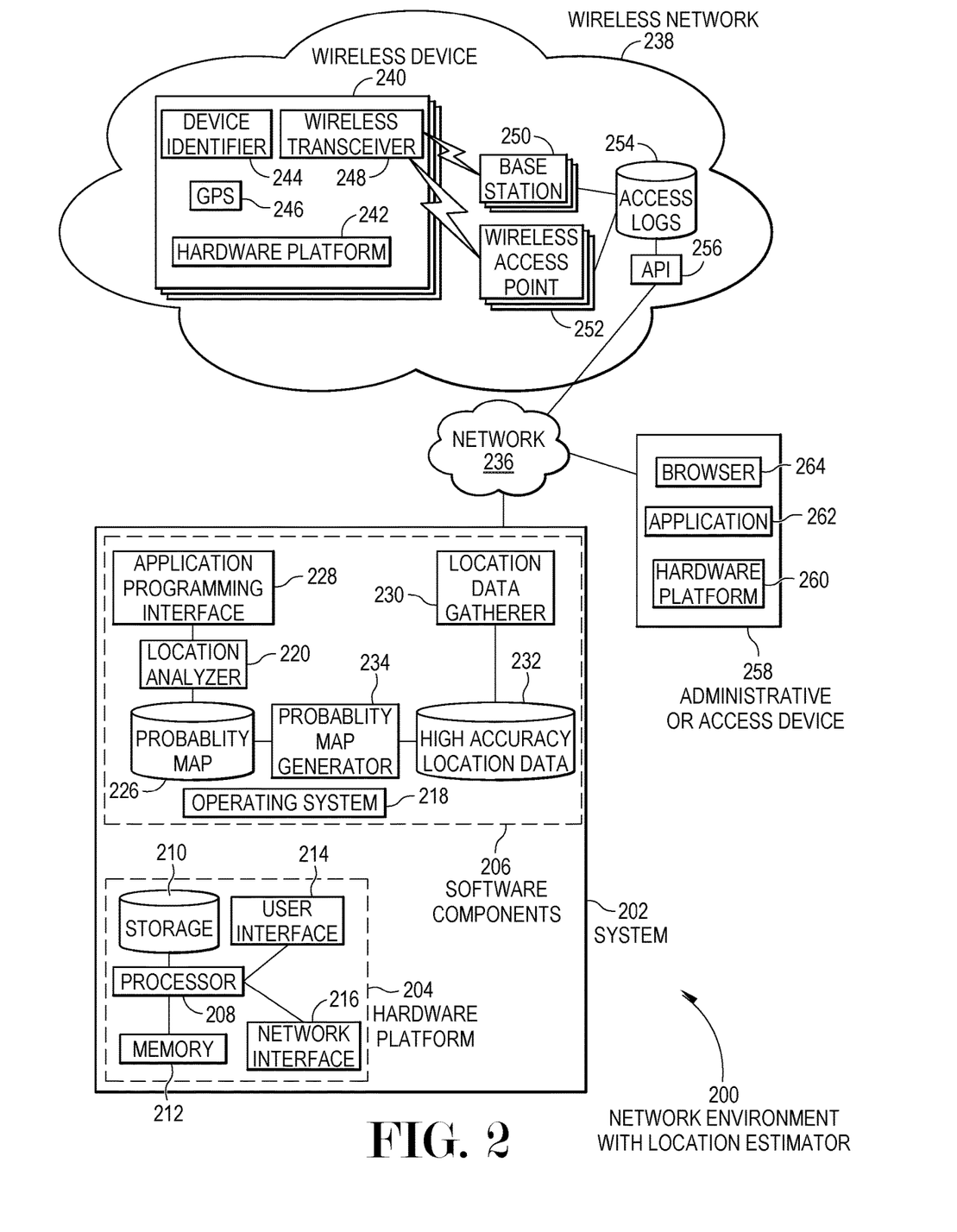
FIG. 2 is a diagram illustration of an embodiment showing a network environment with a location estimator.

FIG. 2 is a diagram of an embodiment 200 showing components that may analyze estimate user location based on coarse location information and a probability map of more precise user locations. The example of embodiment 200 is merely one topology that may be used to analyze user locations.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A location analyzer 220 may use a probability map 226 to estimate a relatively precise user location based on a coarse location that may be supplied from various sources, such as location data obtained from a cellular telephony system. The location analyzer may receive location data that may have a wide variation or large range, and may return an estimated location with a higher degree of precision or more narrow variation.

A probability map 226 may contain a set of probable locations for users within a given area. In a typical example, the probability map 226 may have a set of sub-areas of interest and the likelihood that a user may be in any of the sub-areas.

The probability map 226 may be constructed from a probability map generator 234 that may process high accuracy location data 232 gathered from a location data gatherer 230. The high accuracy location data 232 may be observations of user location that may be more accurate than the sub-areas, such that there may be a high confidence that the observation came from the specific sub-area. These data may be used to determine how users may be dispersed within a cell site area, for example.

A location data gatherer 230 may receive high precision location data for users. Such location data may typically come from a secondary location mechanism, such as GPS or some other location information. In some cases, a second wireless network may identify and determine location information for a sample of people in a specific area. For example, a WiFi, BlueTooth, Radio Frequency Identification (RFID), or other local or short range wireless system may identify and count nearby wireless devices to gather precise location observations. In another example, manual counts of people in a specific area at a given time may be used as raw high accuracy location data. In many cases, data from various sources may be cross-correlated with each other to generate an estimated density.

An application programming interface 228 may provide location data for various applications, websites, or other users of the data. In many cases, an application may provide a query or request through the application programming interface 228, and may receive various location data. In one use case, a query may provide a user identification and the system 202 may return the estimated location for the user at a given time. In another use case, a query may request traffic density at a specific area, and the system 202 may return the estimated number of people, vehicles, or other data. Still other requests and responses may be made against the location system.

A network 236 may connect the system 202 with other devices.

A wireless network 238 may provide location information about various wireless devices 240. The wireless network 238 may be a cellular telephony network, a wireless data network, or some other network to which which mobile wireless devices 240 may connect. In some cases, the wireless network 238 may be WiFi, BlueTooth, Radio Frequency Identification (RFID), or some other technology by which a mobile wireless device 240 may be recognized and identified.

A typical wireless device 240 may have a hardware platform 242 which may have a device identifier 244. The device identifier 244 may be a hardware, software, firmware, or some other type of identifier. In some cases, the identifier may change from time to time, while in other cases the identifier may remain constant. The identifier may be used to identify the wireless device 240 within the wireless network 238 for any of various uses.

One use of an identifier may be used to authenticate a device to the network. In some cases, such an identifier may be a fixed identifier that may be known by or issued by an administrative service of a wireless network. Another use of an identifier may be to identify the device during a single communication session. In some cases, such an identifier may be issued for that communication session and may not be used again.

The identifiers may be used to correlate a device's movement or location. Movement may be detected by correlating the location of a specific device over several locations. Location correlation may be performed by correlating the device through two or more independent mechanisms. For example, a device's location may be detected by a cellular telephony system with one location mechanism, and that location may be correlated with the same device's location detected from a BlueTooth receiver. The correlation may be possible when the same identifier may be used, or when some other correlation may be made between the two observations.

Some devices may be equipped with a Global Positioning System (GPS) receiver 246 or some other location detection mechanism. The GPS receiver 246 may be capable of detecting a device's location with a high degree of accuracy. The GPS receiver 246 or other location detection mechanism may provide high accuracy location data that may be used by a probability map generator 234 to determine the probability map 226.

A wireless transceiver 248 may connect to a base station 250 in a cellular telephony system, or to a wireless access point 252 in a wireless data system. Some systems may permit a device to move between base stations 250 or wireless access points 252 while maintaining a communication session. Such protocols may have various handoff mechanisms for accomplishing such transitions.

The base stations 250 or wireless access points 252 may generate access logs 254. The access logs 254 may include any transactions, communications, or observations of wireless devices. In some cases, a base station 250 or wireless access point 252 may merely observe the presence of a device in the vicinity and may not actually establish a two-way communication session with the device.

The access logs 254 may be made available to the system 202 through an application programming interface 256.

An administrative or access device 258 may be any type of device through which access may be made to the system 202 to determine various location information. The device 258 may have a hardware platform 260 on which an application 262 or browser 264 may execute. The device 258 may be a wireless handset, tablet, desktop, or other personal device. In some cases, the device 258 may be a server computer, server fabric, or other large scale computational platform.

An application 262 may be any type of computer program that may use location data. In some cases, the application may be specifically designed to query and display traffic, location, and other information. In other cases, the application may have another purpose and may query the location information as a secondary function. In a simple example, a Customer Relationship Management (CRM) system may perform location-related queries as part of the overall CRM functions. Many other applications may take advantage of location-based data provided by system 202.

In some cases, a browser 264 may be used to access a website that may query the system 202. The browser 264 may also be used to access any administrative website provided by the system 202 for configuration and administration purposes. In some cases, the system 202 may provide a website by which users may make location-based queries through a browser 264.

Figure 3:
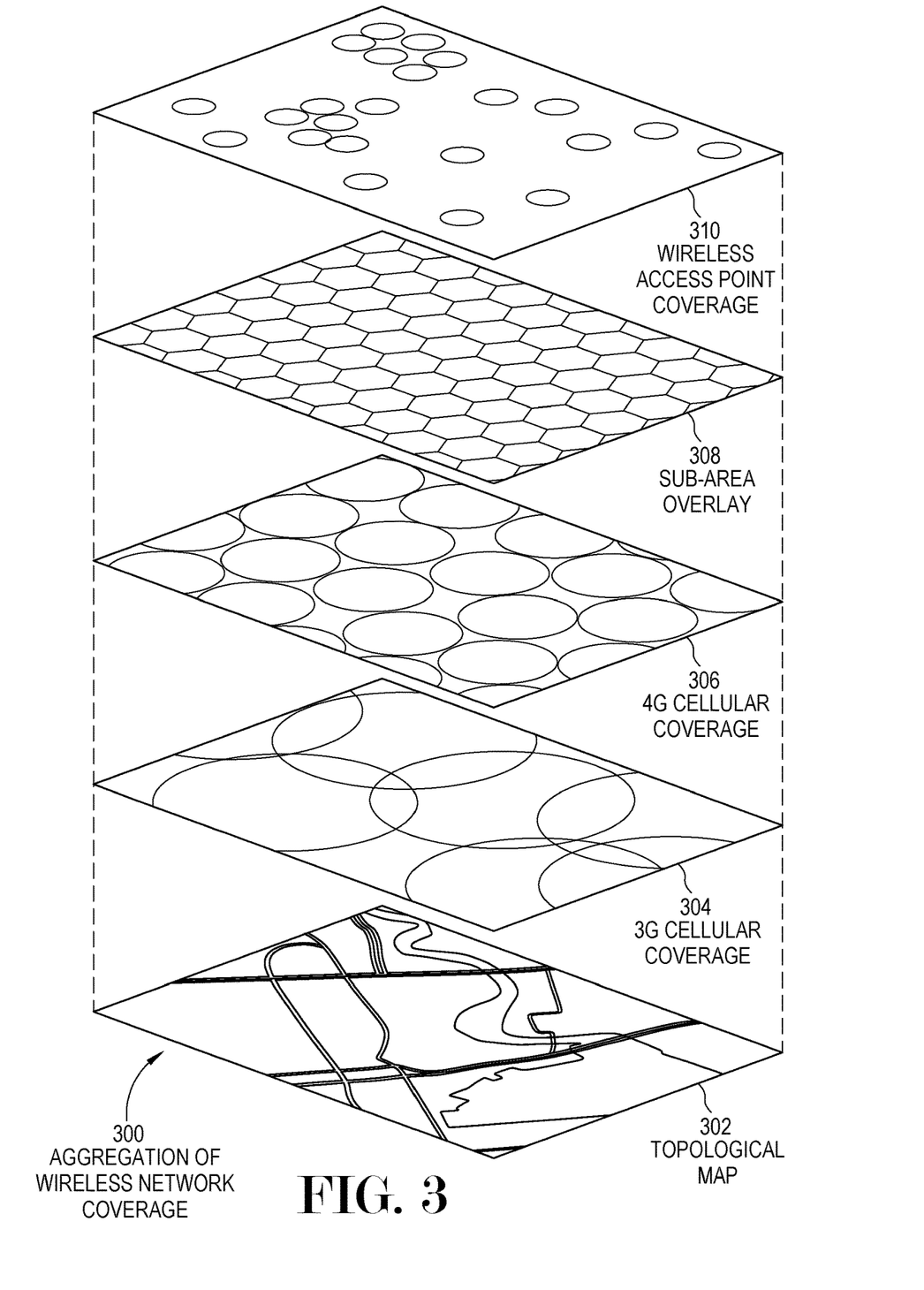
FIG. 3 is a diagram illustration of an example embodiment showing several layers of wireless data that may be aggregated.

FIG. 3 is a diagram illustration of an example embodiment 300 showing several different layers of information that may be overlaid on each other.

Multiple datasets may be available to a location based system. In a typical cellular telephony system, multiple protocols may be used over multiple frequency bands. In some cases, older protocols may be kept operational to service customers with older handsets, while more efficient and faster protocols are being rolled out. In some cases, a carrier with one set of protocols and frequency spectrum may be purchased by another carrier, forcing the acquiring carrier to maintain two sets of protocols to service their customers.

In some cases, data may be available from non-telephony systems, such as wireless data networks. Such networks may operate IEEE 802.11, IEEE 802.16, or any other wireless connection protocol. Such networks may have access points that may or may not permit handoffs between access points.

A topological map 302 may represent the physical world of the example. Maps of 3G cellular coverage 304 and 4G cellular coverage 306 may be illustrated as being overlaid on the topological map 302. The 3G and 4G coverages 304 and 306 may represent separate sets of base stations or access points for the respective networks. In many cases, the physical location of antennas for different networks may be deployed in different places and with different coverage densities.

The sub-area overlay 308 may represent the sub-areas of interest for determining a user's location. The sub-areas may not correspond directly with the cellular coverages 304 or 306, and, in some cases, may not correspond directly with features of the topological map 302. In some cases, the sub-areas may be constructed to correspond at least in part with physical locations and features of a topological map 302.

A wireless access point network may have coverage map 310. The wireless access points may be any type of network or set of devices that may observe a wireless device or may establish communications with the device.

The various maps in the illustration of embodiment 300 may illustrate that data from multiple cellular networks or wireless access point networks may be mapped back to determine location information with respect to the sub-areas. A typical system may receive location data provided by a 3G or 4G network, each of which may have different sets of tolerances and variances associated with the location information provided by the network. The location information may be projected onto a sub-area map to estimate a user's location, traffic density, or other location information.

In some cases, data from multiple networks may be aggregated to determine a high accuracy location for a device. For example, a device may be detected on a wireless network at the same time as being detected on one or more cellular networks. By triangulating the information provided by several networks, a high accuracy location may be found. The high accuracy location may be used to identify that user's location with precision, as well as to populate a high accuracy location database that can be used to generate a probability map.

Figure 4:
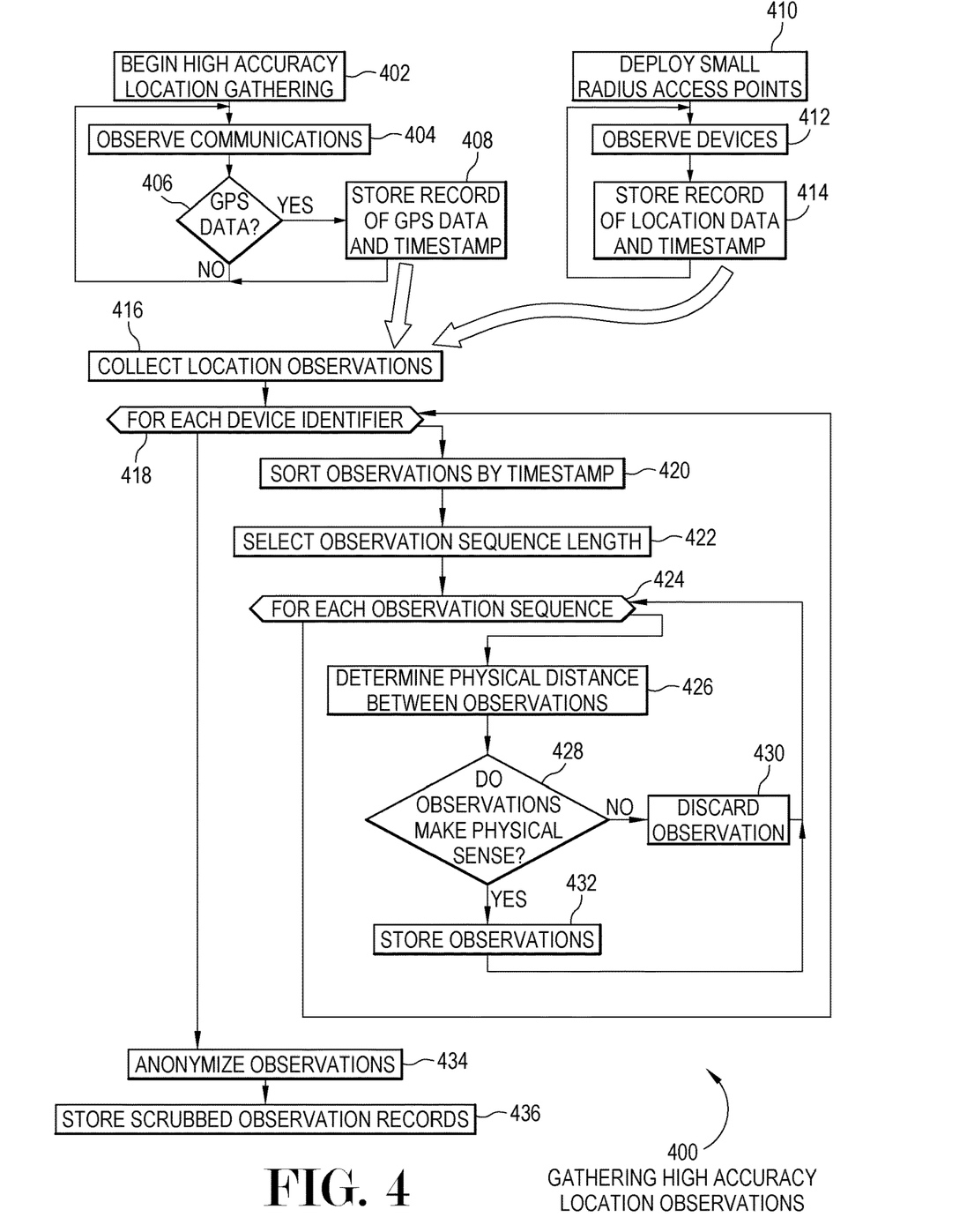
FIG. 4 is a flowchart illustration of an embodiment showing a method for gathering high accuracy location observations.

FIG. 4 is a flowchart illustration of an embodiment 400 showing a method of generating high accuracy location observations. Embodiment 400 is a simplified example of a sequence for collecting high accuracy location data, then scrubbing the data to discard observations that appear to be improper.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 is an example of collecting high accuracy location data. The high accuracy location data may be used to generate a probability map for an area. The probability map may then be used to estimate various location information from low-accuracy location information.

One method for gathering high accuracy location data may begin in block 402. Communications of a device may be monitored in block 404 and if Global Positioning System (GPS) data may be transmitted from the device in block 406, that GPS data may be stored with a timestamp as high accuracy location data.

Some devices may operate various applications that may use a device's internal GPS receiver. As part of the application, communications may include GPS data transmitted from the device to a remote server. Typical applications that may use GPS data may be navigation applications, virtual or augmented reality applications, restaurant recommendation applications, and a host of other applications.

The GPS information gathered from a device's GPS receiver may be transmitted using a standardized format that may be detected by packet sniffing or other communications observation mechanisms. These GPS readings may give precise, high-accuracy location information that may be more precise than location information that may be available from a cellular network.

Another method for gathering high accuracy location data may begin in block 410, where small radius access points may be deployed. Observations may be made in block 412, which may identify a device nearby. These observations may be stored in block 414 with the location information and timestamps.

The operations of blocks 410-414 may represent a method of passively observe the density of devices that may be near an access point. In some cases, the access point may be a wireless data access point, a BlueTooth device, location beacon, RFID reader, or some other wireless detection mechanism.

The operations of blocks 402-408 and 410-414 are merely two examples of ways that high accuracy location information may be gathered. Other mechanisms may also be used to observe users.

The remaining steps in embodiment 400 may illustrate one mechanism by which observations may be scrubbed of errors.

The location observations may be collected in block 416. A location observation may typically include a device identifier, a timestamp, and a set of location coordinates. Some systems may collect additional data.

For each device identifier in block 418, the observations may be sorted by timestamp in block 420.

An observation sequence length may be selected in block 422. The observation sequence length may be a number of observations which may be compared to determine whether the location observations may make physical sense. In some cases, the length may be given in timespan or some other metric. The observations for a given device identifier may be broken down into observation sequences.

For each observation sequence in block 424, the physical distance between each observations may be determined in block 426. An analysis may be made in block 428 to determine whether the sequences make sense. When the observations do not make sense, the observations may be discarded in block 430. When the observations do make sense, the observations may be stored in block 432.

For a sequence of observations to make physical sense, the movement between observations may correspond with a normal method of transport. For example, a person may move at walking speed, or may use a bicycle, car, taxi, bus, train, airplane, ferry, or other mode of transportation. An impossible sequence may be to have a user move at a walking speed for several observations, then at an extremely high rate of speed to another observation. The last observation may be questionable and therefore discarded.

After cleaning the observation list of impossible observations, the observations may be anonymized in block 434 and stored in block 436.

Figure 5:
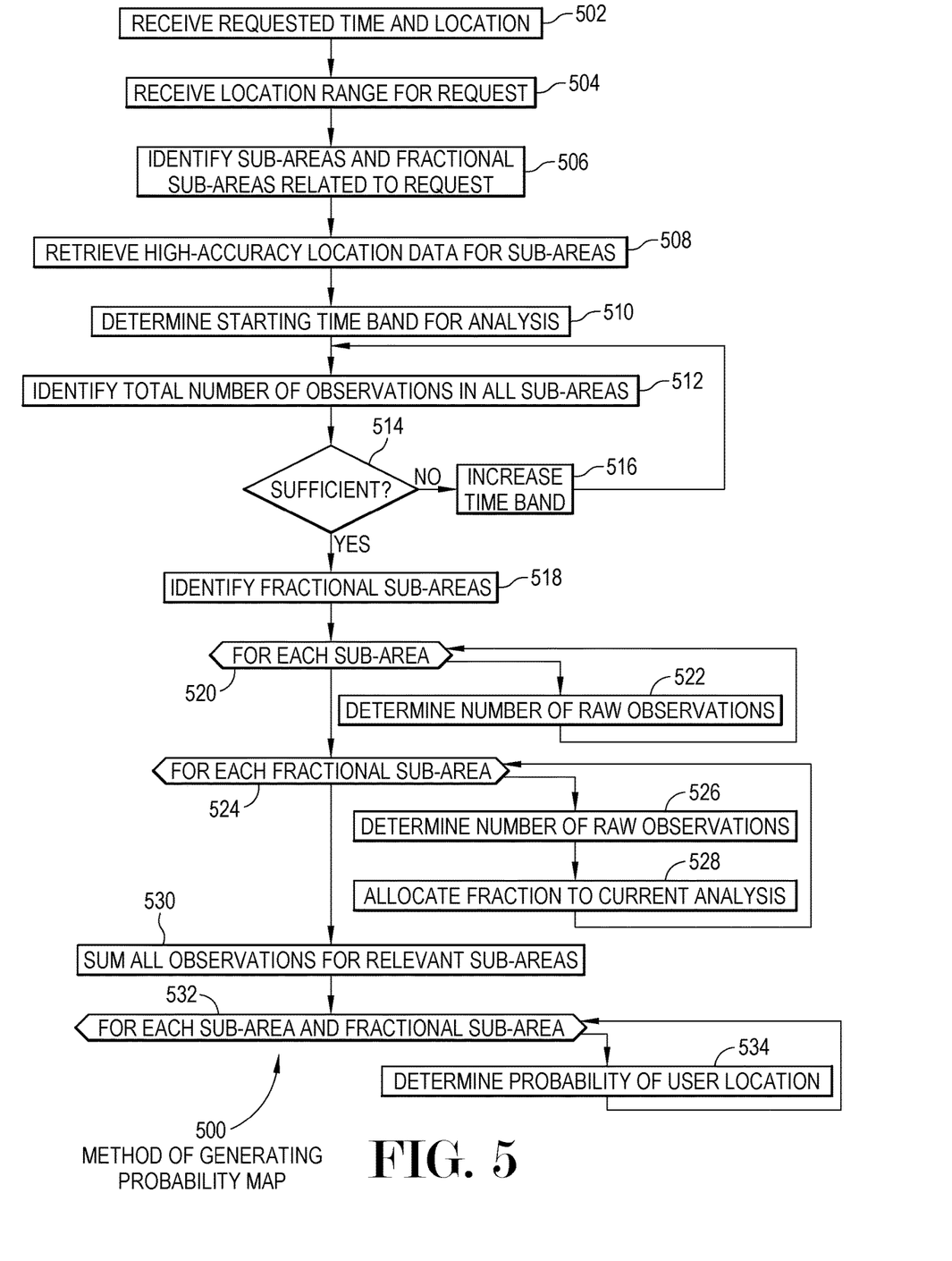
FIG. 5 is a flowchart illustration of an embodiment showing a method for generating a probability map.

FIG. 5 is a flowchart illustration of an embodiment 500 showing a method of generating a probability map from high accuracy location observations. Embodiment 500 is a simplified example of a sequence for generating a probability map that may be used to estimate a user's location with precision, as well as generate statistics for various locations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A requested time and location may be received in block 502. The request may include a location range or accuracy of the incoming request in block 504. The time and location may refer to the timeframe and location about which an analysis may be made. One example analysis may be to estimate a user's precise location when given a coarse location at a given time. Another example may be to generate various statistics about a precise location given a group of observations in a general area.

A set of sub-areas and fractional sub-areas may be identified in block 506. A sub-area may be any subdivision of the location range for which individual statistics may be generated. In the example of embodiment 112, a sub-area may be defined as a hexagon pattern overlaid on a topological map. Other embodiments may use different definitions for sub-areas.

A fractional sub-area may be a sub-area that may be divided by a location perimeter. In the example of embodiment 112, a fractional sub-area may be any hexagon that may be divided by the radius of a cell tower range 118.

High accuracy location data may be retrieved for all identified sub-areas in block 508.

A starting time window or time band may be identified in block 510. The time band may be a starting and ending time for which observations may be analyzed. In general, a higher number of observations may lead to more accurate estimations. However, a wider time window may decrease accuracy when there may be large changes in observations in various sub-areas.

The total number of observations across the sub-areas may be counted in block 512. If the total number is insufficient in block 514, the time band may be increased in block 516 and the process may return to block 512 to increase the number of observations. When the total number of observations is sufficient in block 514, the process may continue.

The process steps of blocks 510-516 may select the smallest time band for which a meaningful set of data may be retrieved. An appropriate number of observations may be different for various situations. In situations where the size of the sub-areas may be relatively small compared to the coarse location range, a higher number of observations may be desired. In situations where a higher reliability for the location estimation may be desired, a higher number of observations may be used.

The set of fractional sub-areas may be identified in block 518.

For each sub-area in block 520, the number of raw observations may be determined in block 522. For each fractional sub-area in block 524, the number of raw observations may be determined in block 526 and the fraction of those observations to be allocated to the fractional sub-area may be allocated in block 528.

The total number of observations of all the sub-areas may be summed in block 530. For each sub-area and fractional sub-area in block 532, the probability of a user location may be determined in block 534.

The net result of the embodiment 500 may be a set of sub-areas with a probability assigned to each sub-area. The probability may represent the distribution of people across the region of interest.

Figure 6A:
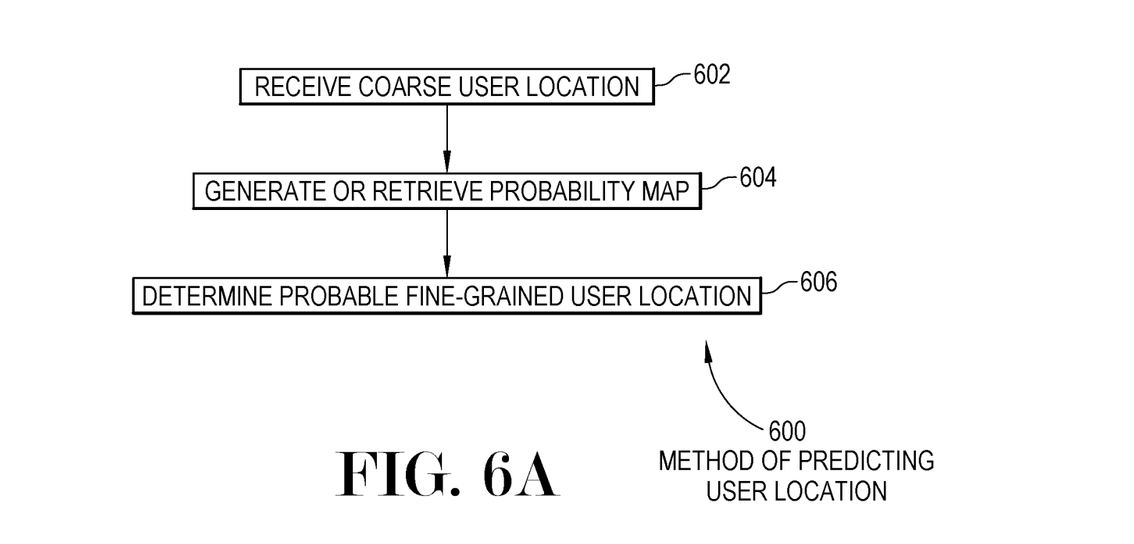
FIG. 6A is a flowchart illustration of an embodiment showing a method for analyzing a probability map to estimate a user's location with high precision.

FIG. 6A is a flowchart illustration of an embodiment 600 showing a method of predicting a user location. Embodiment 600 is a simplified example of a method of generating a predicted precise location when given a coarse location for a user. The coarse location may have a large express or implied tolerance or variation, while the predicted precise location may have a tighter tolerance or smaller variation.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A coarse user location may be received in block 602. The user location may include a timestamp and may be part of a query to determine a precise location for a user. A typical use case may be to receive a user's location as observed from a cellular telephony system, which may give the user's location as the base station or wireless access point location, or may provide a rough triangulated position for the user.

A probability map may be retrieved or generated in block 604. A method of generating a probability map may be found in embodiment 500. In some cases, a probability map may be generated ahead of time and stored for later retrieval. In other cases, a probability map may be generated after receiving the request of block 602.

A probable fine-grained location for the user may be determined in block 606 for the user. In many cases, the user location may be given as the most probable sub-area within the probability map.

Figure 6B:
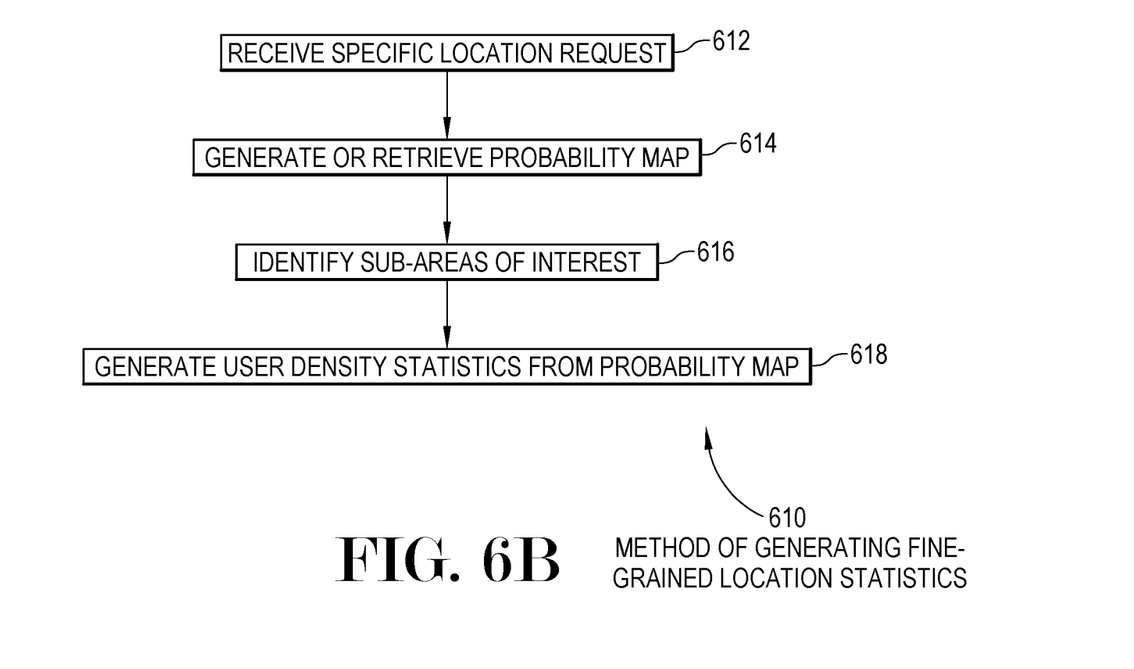
FIG. 6B is a flowchart illustration of an embodiment showing a method for analyzing a probability map to estimate statistics for sub-areas based on coarse location observations.

FIG. 6B is a flowchart illustration of an embodiment 610 showing a method of generating fine-grained location statistics given a set of coarse-grained data. Embodiment 610 is a simplified example of a method of generating statistics for various sub-areas based on a set of coarse grained observations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 610 may receive a request in block 612 for location statistics. In many cases, a request may include a set of coarse location observations. In an example use case, a request may wish to know the approximate number of users in one or more sub-areas, and the request may include the number of devices observed to be connected to a single cell tower.

A probability map may be retrieved in block 614 or may be generated in response to the request. The sub-areas of interest may be identified in block 616 and user density statistics may be generated from the probability map in block 618. A typical user density statistic may be the estimated number of users in a sub-area at the time of the observations.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:

receiving a first incoming dataset comprising wireless access point connection data for a first area, said dataset comprising a first number of devices observed by a first wireless access point within a first time period, each of said devices being associated with a sequence of observations, said first wireless access point being a cellular telephony access point;

creating a probability map having a plurality of sub-areas comprising said first area, said probability map having time-based probabilities of device density within each of said sub-areas, said probability map being generated from said first incoming dataset;

for each of said sub-areas, determining a probable density of devices within each of said plurality of sub-areas based on said probability map;

identifying a first device, said first device being in said first incoming dataset and having a first sequence of observations;

identifying an impossible observation within said first sequence of observations and discarding said impossible observation from said first sequence of observations to create an amended first sequence of observations; and determining a probable sub-area for said first device based on said probable density of devices during said first time period and said amended first sequence of observations.

2. A computing apparatus comprising:

at least one processor; and a memory storing instructions that, when executed by said at least one processor, configure the apparatus to:

receive a first incoming dataset comprising wireless access point connection data for a first area, said dataset comprising a first number of devices observed by a first wireless access point within a first time period, each of said first number of devices having a sequence of observations, said first wireless access point being a cellular telephony access point;

receive a probability map having a plurality of sub-areas comprising said first area, said probability map having time-based probabilities of device density within each of said sub-areas, said probability map being generated from said first incoming dataset;

for each of said sub-areas, determine a probable density of devices within each of said plurality of sub-areas based on said probability map;

identify a first device, said first device being in said first incoming dataset and having a first sequence of observations;

identify an impossible observation within said first sequence of observations and discarding said impossible observation from said first sequence of observations to create an amended first sequence of observations; and determine a probable sub-area for said first device based on said probable density of devices during said first time period and said amended first sequence of observations.

3. The computing apparatus of claim 2, said first area being a cell within a cellular telephony system.

4. The computing apparatus of claim 2, said first area being a triangulated position generated from a plurality of wireless access points.

5. The computing apparatus of claim 4, said first area being a triangulated position generated from a plurality of wireless access points plus a radius from said triangulated position.

6. The computing apparatus of claim 2, said first incoming dataset comprising said first number of devices connected to said first wireless access point at a given time.

7. The computing apparatus of claim 2, said first incoming dataset comprising said first number of devices observed by said first wireless access point between a first time and a second time.

8. The computing apparatus of claim 2 wherein the instructions further configure the apparatus to:

determine a margin of error for said probable sub-area for said first device.

9. The computing apparatus of claim 2 wherein the instructions further configure the apparatus to:

identify a first sub-area having a first portion inside said first area and a second portion outside said first area;

determine a first probable density for said first sub-area by determining an area ratio of said first portion and said second portion.

10. The computing apparatus of claim 2 wherein the instructions further configure the apparatus to:

determine an actual location for said first device, said actual location being determined by a second location mechanism; and add said actual location for said first device at said first time period to an observation database, said observation database being used to generate said probability map.

11. The computing apparatus of claim 10, said second location mechanism being a Global Positioning System location mechanism.

12. The computing apparatus of claim 10, said second location mechanism being a location observation from a second wireless access point.

13. The computing apparatus of claim 10, said second location mechanism having a location granularity smaller than that of said first incoming dataset.

14. The computing apparatus of claim 2 wherein the instructions further configure the apparatus to:

capture a first sample of devices at a first time within a first sub-area, each of said devices having a device identifier;

store said device identifiers of said first sample;

capture a second sample of said devices at a second time within said first sub-area;

store said device identifiers of said second sample;

determine a group of common device identifiers from said first sample and said second sample; and estimate a population of said devices within said first sub-area based on said first sample and said second sample.

15. The computing apparatus of claim 14 wherein the instructions further configure the apparatus to:

said estimating a population of said devices within said first sub-area being computed by multiplying the number of said device identifiers in said first sample by the number of said device identifiers in said second sample and divide by the number of said device identifiers in said group of common device identifiers.

16. The computing apparatus of claim 14 wherein the instructions further configure the apparatus to:

generate said sub-areas from a physical map; and identify a first sub-area being a low probability sub-area due to physical characteristics of said first sub-area.

17. A method performed on at least one computer processor, said method comprising:

receiving a first incoming dataset comprising wireless access point connection data for a first area, said dataset comprising a first number of devices observed by a first wireless access point within a first time period, each of said devices being defined by sequences of observations, said first wireless access point being a cellular telephony access point;

identifying an impossible observation within a first of said sequence of observations and discarding said impossible observation from said first of said sequence of observations to create an amended first sequence of observations;

generating a probability map having a plurality of sub-areas comprising said first area, said probability map having time-based probabilities of device density within each of said sub-areas, said probability map being generated from said first incoming dataset and using said amended first sequence of observations;

for each of said sub-areas, determining a probable density of devices within each of said plurality of sub-areas based on said probability map;

identifying a first sub-area; and determining a probable population of said first number of devices within said first sub-area during said first time period.

18. A computing apparatus comprising:

at least one processor; and a memory storing instructions that, when executed by said at least one processor, configure the apparatus to:

receive a first incoming dataset comprising wireless access point connection data for a first area, said dataset comprising a first number of devices observed by a first wireless access point within a first time period, each of said devices being defined by sequences of observations, said first wireless access point being a cellular telephony access point;

identify an impossible observation within a first of said sequence of observations and discarding said impossible observation from said first of said sequence of observations to create an amended first sequence of observations;

generate a probability map having a plurality of sub-areas comprising said first area, said probability map having time-based probabilities of device density within each of said sub-areas, said probability map being generated from said first incoming dataset and using said amended first sequence of observations;

for each of said sub-areas, determine a probable density of devices within each of said plurality of sub-areas based on said probability map;

identify a first sub-area; and determine a probable population of said first number of devices within said first sub-area during said first time period.

19. The computing apparatus of claim 18, said first area being a cell within a cellular telephony system.

20. The computing apparatus of claim 18, said first area being a triangulated position generated from a plurality of wireless access points.

* * * * *